United States Patent Office 3,316,725
Patented May 2, 1967

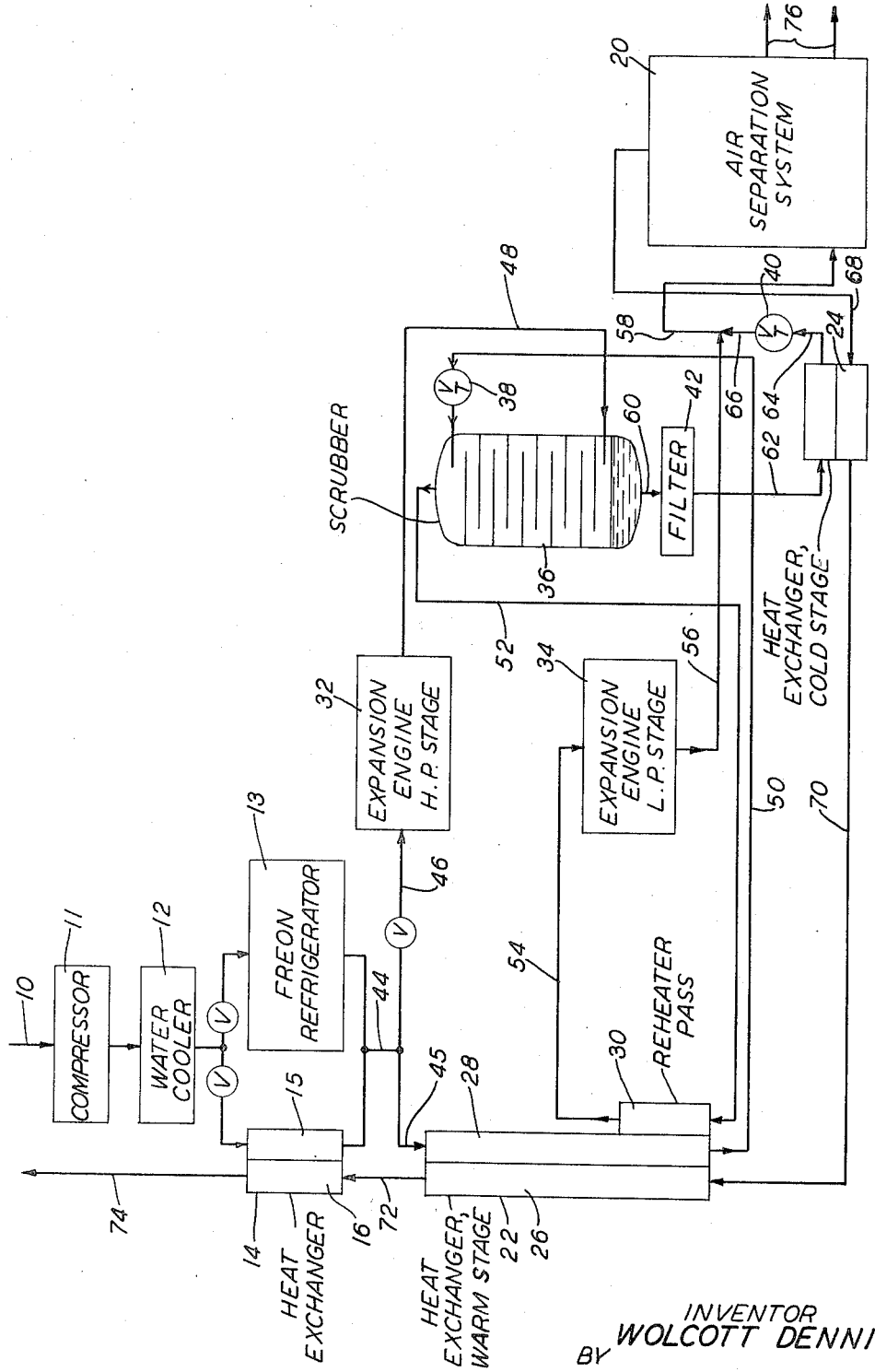

3,316,725
REFRIGERATING AND CONDITIONING OF A PROCESS STREAM IN A CRYOGENIC PROCESS
Wolcott Dennis, Basking Ridge, N.J., assignor to Air Reduction Company, Incorporated, New York, N.Y., a corporation of New York
Filed May 20, 1964, Ser. No. 368,802
9 Claims. (Cl. 62—14)

This invention relates to apparatus and methods for refrigerating and conditioning a process stream in a cryogenic process, and more particularly to the refrigeration and preconditioning of an incoming air stream in a process for deriving from atmospheric air one or more of its components as products in liquid or gaseous state.

It is an object of the invention to increase the thermal efficiency of a refrigeration system of the type used in cryogenic processes, for example in such an air separation system.

Another object is to increase the percentage of the incoming process stream that can be converted into product while leaving available sufficient incoming material to serve as refrigerant for carrying on the separation process.

Another object is to clean a process stream of dangerous or otherwise undesired contaminants while maintaining improved thermal efficiency of a refrigeration system which is being employed to refrigerate the process stream.

A further object is to remove contaminants from a process stream before the stream is fed into the separation system.

A feature of the invention is a vapor-liquid contact device employed to determine definite vapor and liquid temperatures for effecting control of the temperature conditions in counter-current heat exchangers to improve the thermal efficiency of the heat exchange.

Another feature is the use of two stages of expansion engines to establish an intermediate pressure whereby a heat exchanger can be operated in two stages in order to minimize the operating temperature difference in each stage.

A further feature is a redistribution of refrigeration between expansion engines and expansion valves to increase the proportion of refrigeration furnished by expansion engine as compared to refrigeration furnished by valve expansion, thereby to increase the thermal efficiency of the overall refrigeration process.

Still another feature is the separation of liquid from vapor in the vapor-liquid contact device to obtain liquid which is subcooled in the colder stage heat exchanger to improve temperature conditions in that stage, whereby reducing flashing in a following throttle valve, and reducing irreversibilities during heat transfer in the heat exchanger and in the process as a whole.

Other objects, features and advantages will appear from the following more detailed description of an illustrative embodiment of the invention, which will now be given in conjunction with the accompanying drawing, the single figure of which is a combined schematic diagram and flow sheet of a cryogenic system embodying the invention.

The drawing shows a block 20 which represents a conventional air separation system to which are connected air intake and system refrigeration arrangements embodying the invention.

An air intake conduit 10 feeds atmospheric air at ambient temperature and pressure into a compressor 11. The compressed air is cooled in the usual manner first in a water cooler 12 and then divided between a Freon refrigerator 13 and a cooling pass 15 of a counter-current heat exchanger 14. In the exchanger 14, the incoming air stream is cooled by heat exchange with cold waste gas, for example nitrogen, from the air separation system, passing through a heating pass 16. Up to this point, the air intake and refrigeration system may be conventional.

The remainder of the air intake and refrigeration system involves a novel combination of elements including among other components two additional counter-current heat exchangers 22 and 24. The exchanger 22 is provided with the usual pass 26 for cold gas, the usual pass 28 for warm gas, and a reheat pass 30, the latter pass extending preferably from the cold end of the exchange 22 to a point part way toward the warm end. Two stages of expansion engines are provided, designated 32 and 34 respectively. There are also provided a scrubber column 36, two throttle expansion valves 38 and 40, and a filter 42.

High pressure cold air, at for example about 170 atmospheres and 230° K., is supplied to an inlet conduit 44 from the exchanger pass 15 and the Freon refrigerator 13. The air intake is again divided into two streams, of which one, about 45 percent by weight, goes through a valved conduit 46 to the expansion engine 32 wherein it performs mechanical work and is reduced in pressure to an intermediate pressure, for example 18 atmospheres, cooled to about 130° K., and fed into the lower portion of the scrubber 36 as vapor through a conduit 48. The other air stream, at high pressure, is conducted through a conduit 45, cooled in the pass 28 of the exchanger 22 also to about 130° K. and delivered through a conduit 50 to the throttle valve 38 wherein it is reduced to the intermediate pressure and fed into the upper portion of the scrubber, about 20 percent by weight as vapor and the remainder as liquid. Effluent vapor at about 118° K. from the top of the scrubber is fed through a conduit 52 to the cold end of the reheater pass 30, reheated to about 136° K., which is sufficient to avoid condensation in the second stage expansion engine 34, to which the gas is delivered through a conduit 54. The expanded gas from the exhaust side of the expansion engine 34 at about 6 atmospheres and 101° K. is fed through conduits 56 and 58 to the air separation system 20. The bottom liquid from the scrubber 36 at about 118° K. is drained through a conduit 60 into the filter 42 wherein are filtered out various contaminants, such for example as solid residues from compressor lubricants and solid carbon dioxide. The division by weight between the vapor and liquid outputs of the scrubber is preferably about 62 percent vapor and 38 percent liquid. The filtered liquid is passed through a conduit 62 into the warm end of the heat exchanger 24 wherein it is subcooled to about 98° K. and fed through a conduit 64 to the throttle valve 40. In the throttle valve 40 the material is expanded to substantially the column pressure and column intake temperature, for example 6 atmospheres and 98° K., and fed through a conduit 66 to join the other air stream in conduit 58 and thence to pass into the system 20.

The effluent gas from the system 20, usually waste nitrogen, is fed through a conduit 68 at about 1.3 atmospheres and 94° K. to the cold end of heat exchanger 24 wherein it is heated to about 114° K. as it subcools incoming low pressure liquid, and thence through a conduit 70 to the cold end of the heat exchanger 22 where, in pass 26, it is heated to about 226° K. as it cools high pressure incoming air and is delivered to the cold end of exchanger pass 16 through a conduit 72. The gas is warmed in the pass 16 to substantially ambient atmospheric temperature and discharged into the atmosphere through an outlet conduit 74. Products are removed from the system 20 by way of one or more outlet conduits 76.

The scrubber 36 performs among other functions the usual function of cleaning the incoming air before feeding it into the first column of the air separation system 20. In the scrubber, rising vapors are washed by descending liquids with the usual resulting top vapor fraction and bottom liquid fraction. The top fraction is clean intermediate pressure air. Contaminants, such as solid residues from compressor lubricants and solid carbon dioxide, accumulate in the bottom liquid. The contaminants can be removed or reduced to a satisfactory safe level by filtering the bottom liquid in the filter 42 before feeding the bottom liquid to the column. It will be noted that all the incoming air for the air separation system is passed through the scrubber, and that all the liquid accumulated in the scrubber is passed through the filter.

In accordance with the invention, use is made of an additional function of the scrubber which arises from the fact that the scrubber is a liquid-vapor contact device and as such has a definite equilibrium temperature wherever liquid and vapor are in contact with each other. The equilibrium temperature depends upon the pressure in the scrubber. Accordingly, by choosing the pressure in the scrubber, the temperature of the top vapor as well as that of the bottom liquid may be given a desired value. In accordance with the invention, use is made of this property of the scrubber to determine the temperature, for example about 118° K., of the vapor supplied from the top of the scrubber to the cold end of the heat exchanger 22. This vapor, while fed into the reheat pass 30 is effective to determine as well the temperature of the outgoing air stream issuing from pass 28. The temperature of the incoming gas stream entering the pass 26 is determined by the temperature of the scrubber liquid. The cold end temperatures are thus brought closer together than they would otherwise be, for example 118° K., 130° K., and 114° K. respectively, thereby improving the thermal efficiency of the exchanger 22 by reducing irreversibility during heat transfer. Furthermore, the temperature of the cold end of the heat exchanger 22 should be set high enough so that carbon dioxide in the incoming air is not condensed as solid in the pass 28.

A further advantage is gained from the use of the scrubber in the position shown, due to the fact that the scrubber separates liquid from vapor and the liquid is fed to the heat exchanger 24. The use of liquid instead of gas as the heating fluid in heat exchanger 24 makes possible the use of smaller temperature differences between the two passes of the heat exchanger, thereby reducing irreversibilities of heat transfer therein.

A cryogenic system provided with the input stream conditioning and refrigerating features disclosed herein achieves economy of power considerably beyond what can be expected from prior art systems.

The increase in power economy is attributable mainly to an increase in the thermal efficiency of the heat exchangers which in turn enables the expansion engines to supply a greater proportion of the total required refrigeration, leaving a lesser proportion of the refrigeration to be supplied by Joule-Thompson expansion in throttle valves. Since the thermal efficiency of the expansion engines is known to be greater than the thermal efficiency of the throttle valves, the efficiency of the refrigeration process as a whole is increased.

The increased thermal efficiency of the heat exchangers is due to being able to maintain smaller temperature differences between the passes of the exchangers at all points along their length, thus reducing irreversibilities during heat transfer. Several results flow from the resultant improvement in the efficiency of the heat exchangers.

One, more heat can be removed from the intermediate pressure stream in the heat exchanger 24 before the stream is expanded in the throttle valve 40. This reduces the amount of expansion required in the throttle valve 40, thereby increasing the proportion of the total refrigeration taking place in the expansion engines as compared to that taking place in the throttle valves.

Two, the entire high pressure air stream is expanded to an intermediate pressure and the two intermediate pressure streams, from the expansion engine 32 and from the throttle valve 38, are recombined in the scrubber. This makes it possible to divide the heat exchanger into two stages, 22 and 24, each of which can be operated with less temperature spread at the cold end than would be possible if the entire heat exchange were accomplished in a single unit. In particular, the warm end temperatures in the heat exchanger 24 can be set more nearly equal, for example 114° K. and 118° K. respectively, as compared with the cold end temperatures in the heat exchanger 22, for example 114° K. and 130° K. respectively.

It is generally recognized that in a cryogenic system the cost of refrigeration is attributable mainly to the compressor, for example compressor 11 in the system disclosed herein. The refrigeration paid for at the compressor is utilized in the expansion engines and in the expansion or throttle valves where the actual temperature reductions take place. However, a part of the cost of refrigeration is wasted due to the occurrence of irreversibilities in heat transfer, particularly in the heat exchangers. On the other hand, part of the cost of operating the compressor is returned by the expansion engines in the form of available useful mechanical work that can be done by the engines.

The way in which economy is effected by the present invention may be brought out clearly by considering the results of varying the proportion in which the input stream is divided between the conduits 45 and 46. If all the input stream were to be sent to the expansion engines, as through conduit 46, there would be no provision for recovering the refrigeration carried out of the system 20 by the cold gas in conduit 68, which would be inefficient. On the other hand, if all the input stream were to be sent to the heat exchangers, as through conduit 45, there would be no retrieval of power from the expansion engines, which also would be inefficient. It is evident that, up to a point, the larger the proportion of input stream that can be sent to the expansion engines the better.

In accordance with the invention, the efficiency of the heat exchangers is improved by reducing the irreversibilities during heat transfer therein. This improvement in efficiency means that the given quantity of refrigeration contained in the cold gas in the heat exchangers 22 and 24 can be recovered by utilizing a smaller mass flow of incoming stream material in these heat exchangers. Accordingly, a larger mass flow of incoming stream can be diverted to the expansion engines, and since the engines produce more refrigeration than do expansion valves between the same upper and lower pressure values, and since the engines in addition return a portion of the power expanded in producing the refrigeration, an important saving in the cost of power for refrigeration is effected.

The adjustment of the system to fit the preferred temperature and pressure relationships above set forth will now be described.

The outlet pressure of the compressor 11 is made sufficiently great to give the desired input pressure at the expansion engine 32 and heat exchanger pass 28. The refrigeration developed in the water cooler 12 and the Freon refrigerator 13 is adjusted to give the desired temperature of the air in the conduits 45 and 46, taking into account the expected temperature and rate of flow of the refrigerating gas in the conduit 72. Division of the air streams as between the conduits 45 and 46 is adjusted in known manner to obtain the desired percent of flow in each stream. The pressure range of the expansion engine 32 is selected to give the desired intermediate pressure in the scrubber 36 and conduit 48. The length of the heat exchanger 22 is selected to obtain approximately the desired temperature of the air stream coming out of the pass 28, and the throttle valve 38 is so chosen and adjusted as to expand the air stream issuing therefrom to the selected intermediate pressure.

The length of the reheat pass 30 is determined to give the required temperature of the vapor entering the engine 34 to avoid condensation of the expanding vapor in passing through the engine 34, and to give optimum temperature differences in the heat exchanger 22.

The length of the heat exchanger 24 is selected to obtain the temperature difference between the ends of the heat exchanger corresponding to the temperature difference between the cold gas in conduit 68 coming from the system 20 and the selected temperature at the cold end of pass 26 in heat exchanger 22. The throttle valve 40 is so selected and designed as to reduce the pressure of the material in conduit 64 to approximately the pressure in the conduit 58.

The high pressure of the incoming stream in an air separation system of the kind shown herein may be selected anywhere within a range from about 130 to 200 atmospheres and the intermediate pressure may be selected within a range of about 13 to 23 atmospheres while retaining substantially all the advantages of the invention.

Product output, for example liquid oxygen, may be taken out of the system continuously as by means of an outlet conduit 76 at a rate of as much as about 25 percent by weight of the input feed stream, leaving 75 percent or more of the feed stream available for use as refrigerant in producing the necessary refrigeration for carrying out the air separation. If desired, some product may be taken out in gaseous form. In the case of air separation, the product may be oxygen, nitrogen, argon, or other constitutents, and two or more of the constituents may be taken.

While illustrative forms of apparatus and methods in accordance with the invention have been described and shown herein, it will be understood that numerous changes may be made without departing from the general principles and scope of the invention.

I claim:

1. In an input stream conditioning and refrigerating system for a cryogenic process, in combination, a warm stage counter-current heat exchanger, a cold stage counter-current heat exchanger, said heat exchangers each having a warm end and a cold end and each serving to transfer heat from a respective incoming relatively warm stream to a relatively cold stream of material derived from said cryogenic process, a high pressure engine expansion means, a low pressure engine expansion means, said engine expansion means each serving to work-expand a respective incoming relatively high pressure stream, means to divide the first mentioned input stream into first and second portions, means to conduct said first portion to the warm end of said warm stage heat exchanger, means to conduct said second portion to the input side of said high pressure engine expansion means, a vapor-liquid contacting and separating device, means to conduct the said first portion of the input stream from the cold end of said warm stage heat exchanger to said liquid-vapor device, means to conduct the said second portion of the input stream from the output side of said high pressure engine expansion means to said vapor-liquid device, means to conduct vapor from said vapor-liquid device to the input side of said low pressure engine expansion means, means to conduct liquid from said vapor-liquid device to the warm end of said cold stage heat exchanger, means to combine the output from the cold end of said cold stage heat exchanger with the output from the said low pressure engine expansion means, and means to conduct the so-combined material to the input of the cryogenic process.

2. Apparatus according to claim 1, together with means to vary the relative proportions in which the input stream is divided between said first and second portion, whereby due to the increased thermal efficiency of the said counter-current heat exchangers a larger proportion of the input stream may be passed through the said engine expansion means and a smaller proportion through the said heat exchangers, whereby the over-all thermal efficiency of the refrigerating system is increased.

3. Apparatus according to claim 1, in which first valve expansian means is comprised in the said means to conduct the said first portion of the input stream from the cold end of said warm stage heat exchanger to said vapor-liquid device, and second valve expansion means is comprised between the cold end of said cold stage heat exchanger and said means to combine the output from the cold end of said cold stage heat exchanger with the output from the said low pressure engine expansion means.

4. Apparatus according to claim 1, in which added means is comprised within said means to conduct vapor from said vapor-liquid device to the input side of said low pressure engine expansion means, said added means serving to transfer to said vapor a certain amount of heat from the colder portion of said warm stage heat exchanger to partially reheat said vapor before the same reaches the input side low pressure engine expansion means.

5. Apparatus according to claim 1, in which filtering means is comprised within said means to conduct liquid from said vapor-liquid device to the warm end of said cold stage heat exchanger.

6. In an input stream conditioning and refrigerating system for a cryogenic process, in combination, a warm stage counter-current heat exchanger, a cold stage counter-current heat exchanger, said heat exchangers each having a warm end and a cold end each serving to transfer heat from a respective incoming relatively warm stream to a relatively cold stream of material derived from said cryogenic process, a high pressure engine expansion means, a low pressure engine expansion means, said engine expansion means each serving to work-expand a respective incoming relatively high pressure stream, means to divide the first mentioned input stream into first and second portions, means to conduct said first portion to the warm end of said warm stage heat exchanger, means to conduct said second portion to the input side of said high pressure engine expansion means, a vapor-liquid contacting and separating device, valve expansion means to reduce the pressure of said first portion of the input stream from the cold end of said warm stage heat exchanger to an intermediate pressure that is substantially the output pressure of said high pressure engine expansion means, means to conduct said valve-expanded material at said intermediate pressure to said vapor-liquid device, means to conduct the said second portion of the input stream at said intermediate pressure from the output side of said high pressure engine expansion means to said vapor-liquid device, means to partially reheat vapor from said vapor-liquid device by heat exchange with a portion of the colder portion of said warm stage heat exchanger, means to conduct said reheated vapor to the input side of said low pressure engine expansion means, means to filter liquid from said vapor-liquid device, means to conduct said filtered liquid to the warm end of said cold stage heat exchanger, valve expansion means to reduce the pressure of the output from the cold end of said cold stage heat exchanger to a low pressure that is substantially the output pressure of the said low pressure engine expansion means, and means to conduct the low pressure material from the said low pressure engine expansion means and the low pressure material from the last mentioned valve expansion means to the input of the cryogenic process.

7. Apparatus according to claim 6, in which the said cryogenic process is an air separation process; in which the said first mentioned input stream is at a pressure in a range from about 130 atmospheres to about 200 atmospheres; in which the said output pressure of said high pressure engine expansion means is in a range from about 13 atmospheres to about 23 atmospheres; and in which the said output pressure of said low pressure engine expansion means is about 6 atmospheres.

8. Apparatus in accordance with claim 7, in which the said cryogenic process is an air separation process; in which the said first mentioned input stream is at a pressure of about 170 atmospheres; in which the said output pressure of said high pressure engine expansion means is about 18 atmospheres; and in which the said output pressure of said low pressure engine expansion means is about 6 atmospheres.

9. In an input stream refrigerating system for an air separation process, temperature regulating means comprising, in combination, means to compress the input air stream to a pressure sufficiently high to provide refrigeration for the said process, a counter-current heat exchanger having a first pass in the warm to cold direction, a second pass in the cold to warm direction and a third pass extending in the cold to warm direction from the cold end of the heat exchanger part way toward the warm end, engine expansion means, means to conduct a first portion of the compressed input stream to the warm end of said pass to heat exchange said stream with cold gas derived from said air separation process, means to conduct a second portion of the compressed input stream to the input of said engine expansion means, a vapor-liquid contacting and separating device, said device determining a unique relationship between the temperature of vapor and liquid in contact with each other within said device and the pressure within said device, means to conduct vapor from the output of said engine expansion means to said vapor-liquid device in contact with the surface of the liquid therein, means to maintain said device at a predetermined pressure intermediate between said high pressure and the desired input pressure to said air separation process, said intermediate pressure in said device being substantially the same throughout said device, and so to determine the temperature of vapor leaving said vapor-liquid device and of the liquid in said device under said intermediate pressure, means conducting said vapor from said vapor-liquid device to the cold end of said third pass in said heat exchanger to regulate the temperature at said cold end, means to withdraw liquid from said vapor-liquid device, means to cool said withdrawn liquid in indirect heat exchange with the said cold gas on the way from said process to the said second pass to regulate the temperature at the cold end of said second pass, said temperature regulating means serving to reduce irreversibilities during heat transfer in said heat exchanger and thereby to increase the thermal efficiency of the heat exchanger in cooling said first portion of the compressed input stream, valve expansion means to further cool and partially liquefy the output stream from said first pass of the heat exchanger while expanding the same to substantially said intermediate pressure, and means to deliver said partially liquefied stream to said vapor-liquid device to cool said device and to provide reflux liquid therein.

References Cited by the Examiner

UNITED STATES PATENTS

| | | | |
|---|---|---|---|
| 1,612,164 | 12/1926 | Van Nuys | 62—39 X |
| 2,615,312 | 10/1952 | Yendall | 62—38 X |
| 2,763,138 | 9/1956 | Tsunoda | 62—13 |
| 2,840,994 | 7/1958 | Lobo et al. | 62—18 X |
| 2,915,880 | 12/1959 | Schuftan et al. | 62—13 |
| 2,932,174 | 4/1960 | Schilling | 62—13 |
| 3,216,206 | 11/1965 | Kessler | 62—13 |

NORMAN YUDKOFF, *Primary Examiner.*

V. W. PRETKA, *Assistant Examiner.*